United States Patent [19]
Heikkinen et al.

[11] 4,173,237
[45] Nov. 6, 1979

[54] FIREWOOD SYSTEMS

[75] Inventors: Leo L. Heikkinen; Charles L. Lundborg, both of Prentice, Wis.

[73] Assignee: LaFont Corporation, Prentice, Wis.

[21] Appl. No.: 821,793

[22] Filed: Aug. 4, 1977

[51] Int. Cl.[2] .......... A47J 42/09; B27L 7/00
[52] U.S. Cl. .......... 144/3 K; 144/193 A; 144/326 R; 269/25; 269/265
[58] Field of Search .......... 144/3 K, 193 R, 193 A, 144/194, 321, 322, 326 R, 242 R, 312; 269/25, 32, 265, 269; 83/928

[56] References Cited

U.S. PATENT DOCUMENTS

| | | | |
|---|---|---|---|
| 1,001,272 | 8/1911 | Howard | 144/3 K |
| 3,596,691 | 8/1971 | Broadfoot | 144/312 |
| 3,862,651 | 1/1975 | Heikkinen | 144/3 K |
| 4,076,061 | 2/1978 | Greeninger | 144/3 K |

FOREIGN PATENT DOCUMENTS

| | | | |
|---|---|---|---|
| 233927 | 5/1961 | Australia | 144/193 A |
| 144977 | 12/1960 | U.S.S.R. | 144/3 K |

*Primary Examiner*—Robert Louis Spruill
*Assistant Examiner*—W. D. Bray
*Attorney, Agent, or Firm*—Jacobson and Johnson

[57] ABSTRACT

An apparatus for converting a log into firewood including a remotely controlled log carrier bed, a log cutter and a log splitter and log conveying systems that allow the log to be converted into firewood in one continuous operation.

7 Claims, 6 Drawing Figures

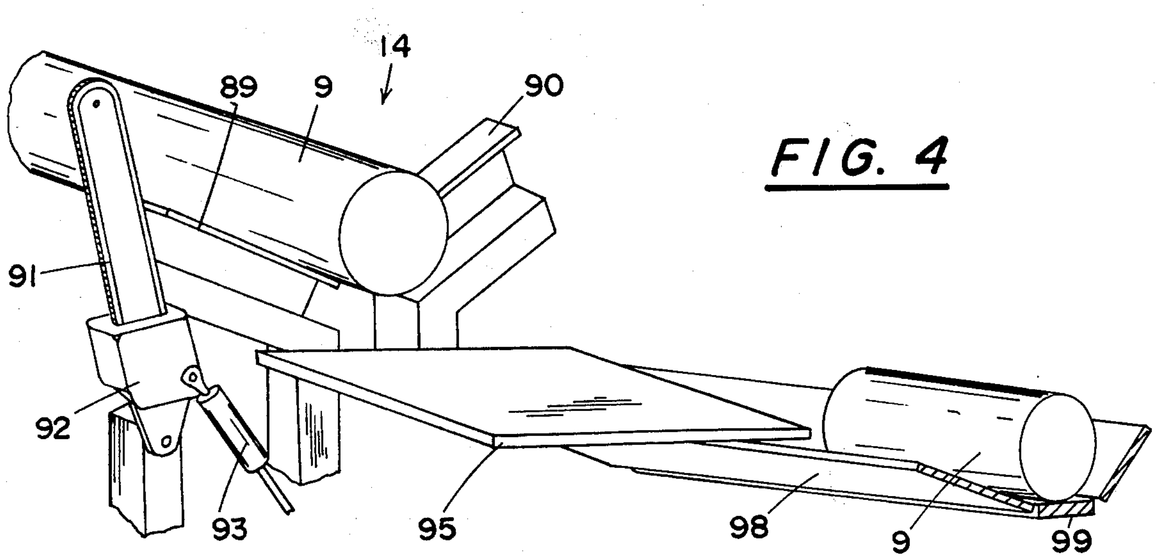
FIG. 4
FIG. 5
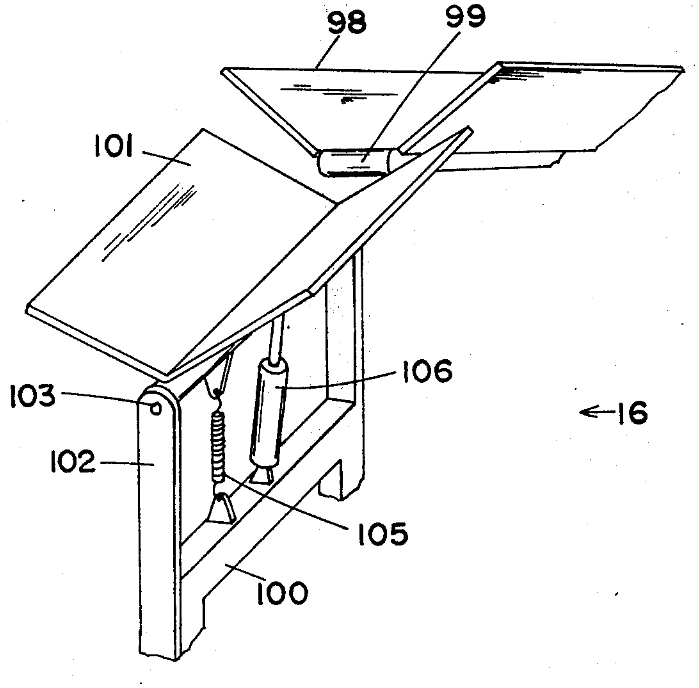

FIREWOOD SYSTEMS

BACKGROUND OF THE INVENTION

1. Field of the Invention

This invention relates generally to apparatus for handling, measuring, cutting and splitting logs and, more particularly, to a system for making firewood from logs.

2. Description of the Prior Art

Various apparatus for splitting firewood are known in the art. A typical example of such prior art apparatus are shown in U.S. Pat. Nos. 3,640,323, 3,077,214, 3,422,955, 3,280,864, 3,356,115, and applicant's prior art U.S. Pat No. 3,862,651. Basically, these prior art apparatus have power actuated rams which either force the cut log into a splitting wedge or force a splitting wedge into a cut log. Thus, the basic concept of splitting a cut log with a power actuated wedge is well known in the art. The prior art inventions also include a saw for cutting the log into proper lengths. The prior art invention shown in applicant's U.S. Pat. No. 3,862,651 comprises a first generation apparatus for advancing, measuring, cutting and splitting logs into fireplace wood.

This first generation prior art system generally comprises a bed for supporting and advancing a log into a position to be cut off. The log supporting bed comprises an endless chain which is mounted on sprocket wheels between sides of a V-shaped trough. A saw is located at the end of the bed for cutting the log into preselected lengths. A hydraulic ram is mounted on the apparatus for splitting the log by forcing the log against a splitting wedge to sever the log into firewood. The hydraulic ram also rotates the endless chain and advances the remaining portion of the log into a position where the end of the log can be cut into fireplace lengths. The present invention, in contrast, provides a second generation system for large scale processing of logs into firewood whereby the logs are placed onto a bed wherefrom they are subsequently delivered to a log holder which feeds the log into a cutting mechanism. After the log is cut to proper length and subsequently split into fireplace wood, the split firewood is conveyed into a bin or carrier.

SUMMARY OF THE INVENTION

Briefly, the present invention comprises a load deck for receiving a pile of uncut logs, means on the deck for advancing a log into position where the log can be properly positioned for transfer to a log holder than engages one end of the log in a pinching action. The log holder is horizontally displaceable so that the log can be advanced into the path of a cutting mechanism which cuts off the end of the log. After the cutting mechanism cuts off the end of the log, the end of the log falls into an elevator which transports the end of the log to a diverter. The diverter allows an operator to reject the end of logs which are not suitable for splitting. The end of logs which are suitable for splitting go into a splitting station where a hydraulic ram forces the log into a splitting wedge. The split end of logs, which are now suitable for use as firewood, are dropped onto an elevating system that elevates the firewood into a truck bed or bin.

BRIEF DESCRIPTION OF THE DRAWING

FIG. 4 is a perspective view of the cutting mechanism and cut log delivery plate;

FIG. 5 is a perspective view of the diverter plate; and

DESCRIPTION OF THE PREFERRED EMBODIMENT

Figure 1:
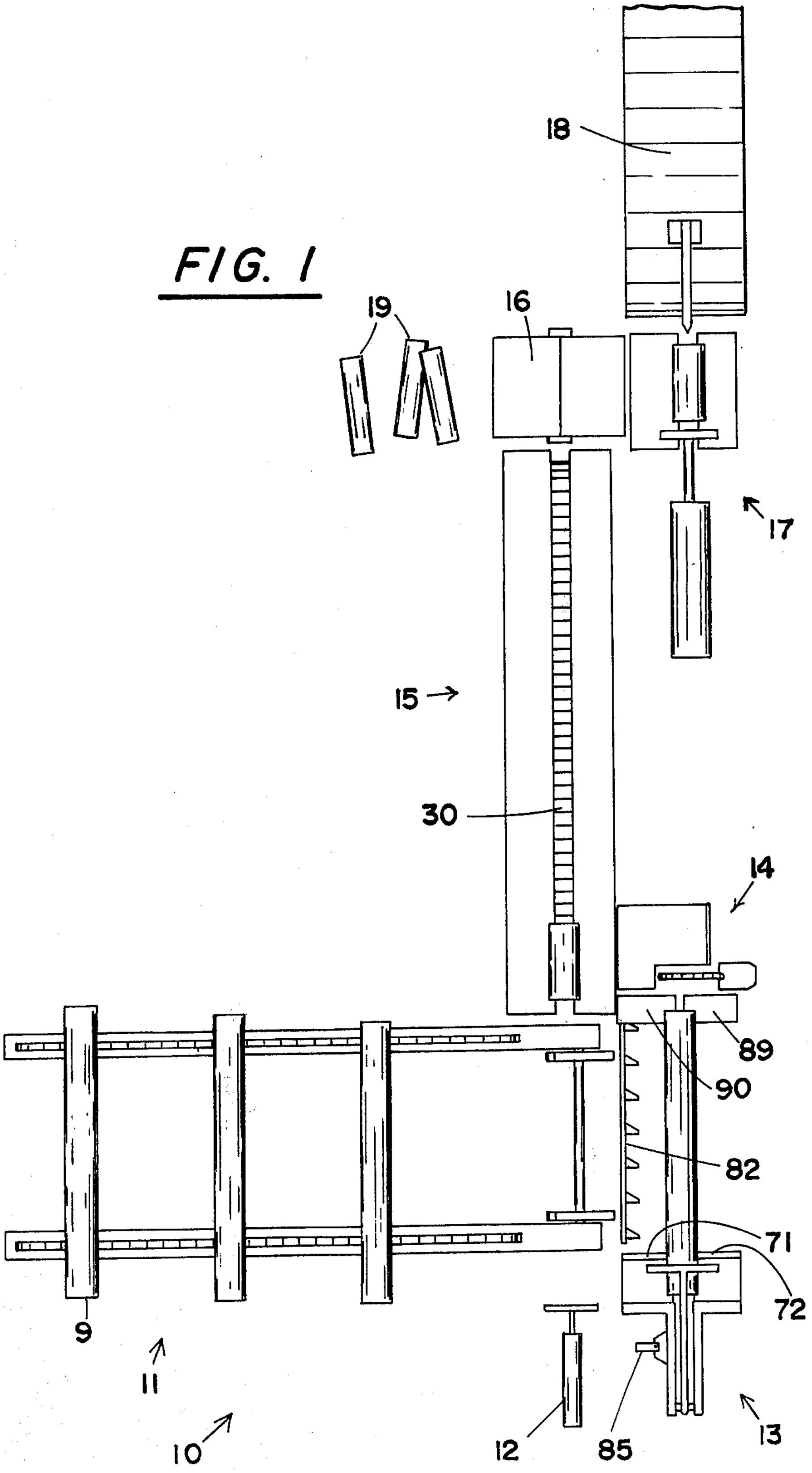
FIG. 1 is a top view showing the various stations of the long splitting apparatus.

Referring to FIG. 1, reference numeral 10 generally designates the system for converting a log into firewood. By firewood it is meant logs that have been cut and split for use in a stove or fireplace. System 10 comprises a log feeding mechanism 11 having a deck to hold a pile of logs thereon. Log feed mechanism 11 contains a pair of endless rotatable chains that carry the logs to a lateral log adjustment member 12 which positions the log lengthwise before the logs are dropped into a log holder 13. Log holder 13 intermittently feeds a log into a cutting mechanism 14 where the log is cut to a length suitable for a fireplace or heating stove. The end of the log rolls or slides onto a transport system 15 which comprises an endles chain 30 located between V-shaped sides. From transport system 15 the logs fall into a V-shaped diverter 16. An operator through remote hydraulic controls (not shown) can tilt diverter 16 to direct the end of the logs into either a splitting mechanism 17 which splits the logs into firewood or into a log pile 19, which does not require splitting. Located below splitting mechanism 17 is an elevating system 18 which elevates the firewood onto a truck bed or the like.

Figure 2:
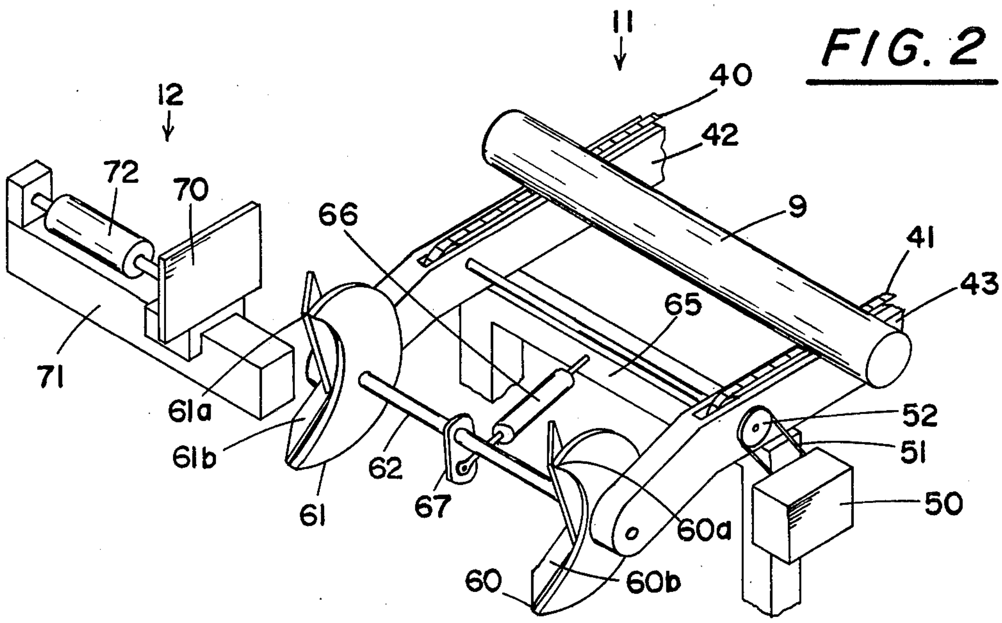
FIG. 2 is a perspective view of the log deck of the log aligning apparatus.

In order to understand the details and features of the present invention, reference should be made to FIG. 1 in conjunction with FIG. 2. FIG. 2 shows in perspective endless rotatable chains 40 and 41 which are located in support beams 42 and 43 of log feed mechanism 11. Chains 40 and 41 have upward projections extending thereon (not shown) for engaging and propelling log 9 into crescent shaped rotatable log holder arms 60 and 61. A motor 50 drives a pulley 52 through belt 51 to rotate endless chains 40 and 41 which advances log 9 into arms 60 and 61. The control for motor 50 is remotely located from the mechanism and is not shown for purposes of clarity. In operation of log feed mechanism 11, the counterclockwise rotation of chains 40 and 41 propels log 9 forward until the log rests against the back of crescent shaped arms 60 and 61. In order for log 9 to drop into crescent shaped arms 60 and 61, it is necessary to rotate arms 60 and 61 clockwise until the leading edges **60*a* and 61*a* are below the top of support beams 42 and 43. To provide common rotation, arms 60 and 61 are connected by a common shaft 62. Shaft 62 is rotated by the coaction of arm 67 and the extension and retraction of hydraulic cylinder 66. Located on one side of crescent shaped arm 60 is a V-shaped log slide plate 61*b* and similarly located on one side of crescent shaped arm 61 is a V-shaped log slide plate 60*b*. Slide plates 61*b* and 60*b* allow a log to be slid up and over arms 60 and 61 without catching on arms 60 and 61 even though the log may have short limbs extending therefrom. A log displacement member 12 slides the log over arms 60 and 61. Log displacement member 12 comprises a hydraulic cylinder 72 and a displaceable plate 70 which slides on beam 71. Signals applied to a hydraulic cylinder 72 permit forward or backward displacement of plate 70**.

In operation, displaceable plate 70 pushes the end of log 9 into proper lengthwise position on crescent shaped arms 60 and 61. After log 9 is positioned properly in crescent shaped arms 60 and 61, log adjuster plate 70 slides backward and into position for positioning another log. Next, arms 61 and 60 rotate counterclockwise allowing log 9 to drop onto the individual log feeder mechanism 13. At one end of log feeder mechanism 13 are a pair of log support members 71 and 72 which are spaced a distance X from a back plate 73. At the other end is a pair of log support members 89 and 90 (see FIG. 4). Both pairs of log support members are arranged in a V pattern to direct the log to a central position between the log support members.

Located in log feeder mechanism 13 is a pivoting arm 74 and a log grasping head 75. Arm 74 is pivotally mounted to housing 76 by a pin 77 and a hydraulic member 78 which allows an operator to pivot arm 74 about pin 77. Head 75 contains a series of serrated projections or teeth for engaging the top of one end of log 9 as it rests in V-shaped members 71 and 72.

Figure 3:
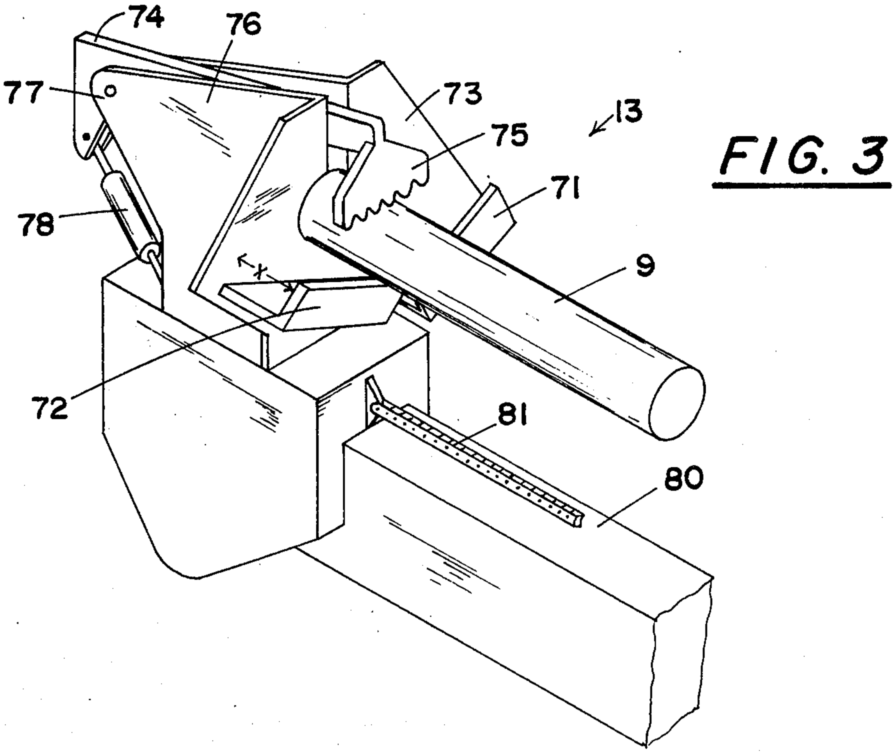
FIG. 3 is a perspective view of the log holding mechanism.

FIG. 3 shows log support members 71 and 72 spaced a distance X of about 12" to 18" from back plate 73. Head 75, back plate 73 and log support members 71 and 72 coact to hold one end of log 9 in a substantially horizontal position as shown in FIG. 3 with the other end of log 9 resting on members 89 and 90.

In order to advance a log into cutting position, log feeder 13 slides along a beam 80. A chain 81 and gear drive mechanism (not shown) pull log feeder 13 along beam 80. In order to control the advancement of log 9, reference should be made to FIG. 1 where there is shown a set of stops on stop shaft 82 which stop the advancement of a log at predetermined intervals. As log 9 is advanced by log feeder 13, a switch contact 85 on log feeder 13 contacts the first stop on stop shaft 82 to stop advancement of log feeder 13. When log feeder 13 is stopped, it activates cutting mechanism 14 which is shown in greater detail in FIG. 4. FIG. 4 shows the members 89 and 90 for holding log 9 and a pivotal mounted chain saw 91. Chain saw 91 is pivotally mounted through member 92. A hydraulic ram 93 allows chain saw 91 to pivot clockwise or counterclockwise. When log 9 is positioned properly on members 89 and 90, a signal is sent to start the chain saw to hydraulic member 93 which pivots saw 91 clockwise. As saw 91 pivots clockwise, it saws off the end of log 9 which projects beyond members 89 and 90. Log 9 falls onto a sloped gravity feed diverting plate 95 which allows the cut end of the log to fall into an elevator 98 containing an endless rotatable chain 99. After the end of log 9 is cut off, chain saw 91 is pivoted counterclockwise to the position shown in FIG. 4. This pivoting action also sends a signal to momentarily rotate stop shaft 82 sufficiently to allow the switch on log feeder 13 to pass the first stop. After disengagement of the first stop, log feeder 13 advances the log until the log feeder contacts the second stop on shaft 82. The process of cutting off log 9 is then repeated until the entire log is cut into proper lengths.

Log elevator station 98 is shown in FIG. 1 and in FIG. 5 in conjunction with a diverter plate 101 which is mounted to a frame 100. Frame 100 contains diverter plate 101 which is pivotally mounted to frame 102 through a shaft 103. A spring member 105 holds diverter plate 101 in a normally upward facing manner. In order to divert a log to the proper position, i.e., to the right or left of member 102, a hydraulic member 106 is provided which can be either retracted or extended. If member 106 is extended, the cut log is directed to the left of frame 102 and into the splitting mechanism. When member 106 is contracted, the cut log is diverted to the right and into a non-splitting pile.

Figure 6:
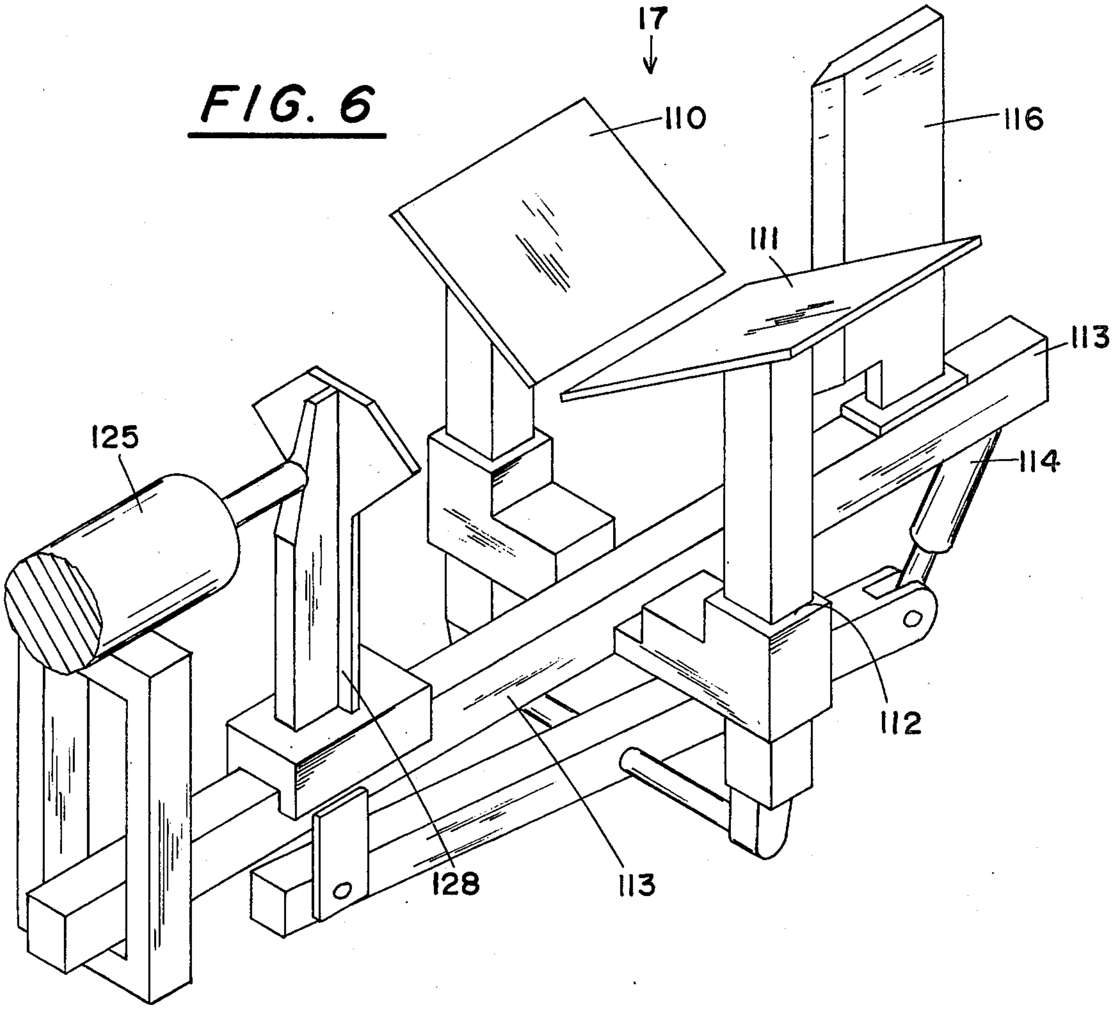
FIG. 6 is a perspective view of the log splitting mechanism.

When the cut log is diverted into the splitting mechanism, the log can be split to proper size. The splitting mechanism 17 is shown in more detail in FIG. 6 and comprises a first log support plate 110 and a second log support plate 111 which are slidably mounted and vertically positionable through housing in support member 113 by a hydraulic member 114. That is, members 110 and 111 can be raised or lowered by extension or contraction of hydraulic member 114. This allows proper positioning of the cut log with respect to the splitting wedge 116. Located in front of splitting wedge 116 is a hydraulic cylinder 125 which is connected to a push plate 128 that slides along housing 113. Typically, cylinder 125 forces member 128 forward and against a log which is held by plates 110 and 111. The log is forced into splitting member 116 as member 120 slides along beam 113 and into the gap between the diverter plates 110 and 111. While only a single blade splitting edge is shown, multiple splitting heads are also usable with the present invention.

After the log is split, the split firewood drops onto an elevating system 18 (FIG. 1). The firewood is elevated to a truck for hauling away. Thus, it can be seen that the present invention allows for the automatic handling and cutting of logs into firewood without any handling of the logs by an operator.

It should be understood that for purposes of clarity the hydraulic lines, switches, controls and electrical connections have been left out of the drawing, however, in actual operation all the hydraulic lines and controls terminate at a single station where an operator can control each individual station or the stations can be allowed to operate continuously

We claim:

1. An apparatus for converting a log into firewood comprising:

a log deck for receiving and holding a plurality of logs to be cut into firewood;

means for removing a log from the plurality of logs held on the log deck and delivering the log from said log deck to a log feeder;

said log feeder having means for grasping and securely holding a log delivered from said log deck at one end thereof;

said means for grasping and securely holding a log including a first log support member and a second log support member that coact to sandwich a log between said first log support member and said second log support member;

means for cutting the log into fireplace wood when said log is held by said log feeder, means for receiving the log cut into firewood and diverting the cut logs to a splitting mechanism; and a splitting mechanism for receiving the cut log and for splitting the cut logs.

2. The invention of claim 1 wherein said means for delivery of the log includes rotatable arms for receiving a log and placing a log in said log feeder.

3. The invention of claim 1 wherein said log feeder includes means for intermittently stopping the advancement of said log feeder.

4. The invention of claim 1 wherein said means for cutting a log comprise a chain saw.

5. The invention of claim 1 wherein said apparatus includes a plate located adjacent said means for cutting the log into fireplace wood to direct a cut log into an elevator.

6. The invention of claim 1 wherein said apparatus includes an elevator for transporting a cut log to the splitting mechanism.

7. The invention of claim 1 wherein said apparatus includes means for selecting cut logs to be split.

* * * * *